F. EICHBERG.
ALTERNATING CURRENT MOTOR CONTROL.
APPLICATION FILED OCT. 26, 1906.
920,843.
Patented May 4, 1909.
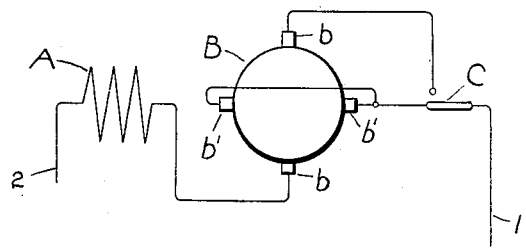
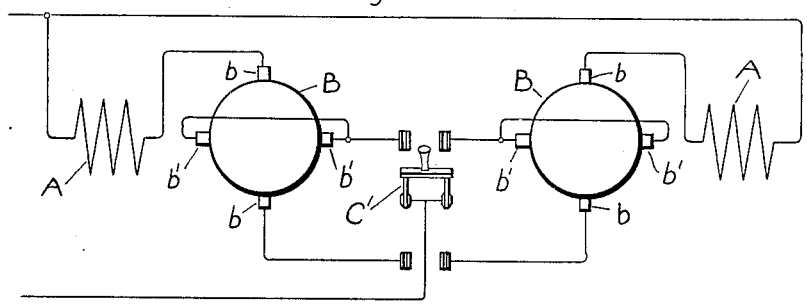
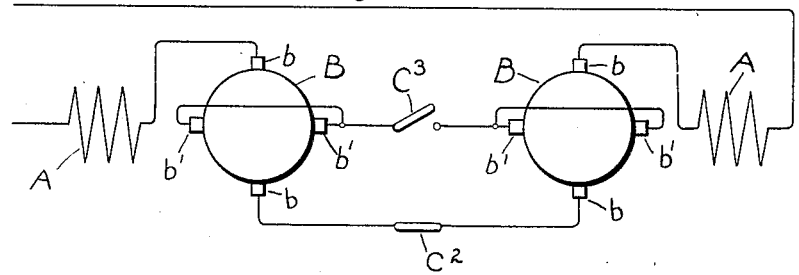
Witnesses:
Inventor:
Friedrich Eichberg.
By Albert G. Davis
Atty.

UNITED STATES PATENT OFFICE.

FRIEDRICH EICHBERG, OF BERLIN, GERMANY, ASSIGNOR TO GENERAL ELECTRIC COMPANY, A CORPORATION OF NEW YORK.

ALTERNATING-CURRENT-MOTOR CONTROL.

No. 920,843.   Specification of Letters Patent.   Patented May 4, 1909.

Application filed October 26, 1906. Serial No. 340,721.

*To all whom it may concern:*

Be it known that I, FRIEDRICH EICHBERG, a subject of the Emperor of Austria-Hungary, residing at Berlin, Germany, have invented certain new and useful Improvements in Alternating-Current-Motor Control, of which the following is a specification.

My invention relates to the control of alternating-current motors of the commutator type, and particularly to the type of motor having a stator winding, commutator brushes short-circuiting the rotor winding on the line of magnetization of the stator winding, and a second set of commutator brushes displaced approximately ninety electrical degrees from the first set.

My invention consists in employing the short-circuited brushes as one rotor terminal at starting, and employing the two brushes of the second set as the two terminals for running.

My invention will best be understood by reference to the accompanying drawings, in which—

Figure 1 shows diagrammatically an alternating-current motor of the commutator type arranged for control in accordance with my invention; Fig. 2 shows an arrangement for controlling two motors in parallel; and Fig. 3 shows an arrangement for controlling two motors in series.

In Fig. 1, A represents the stator winding, which is connected in series with the rotor winding B through the commutator brushes $b\,b$, which are arranged on a line displaced ninety electrical degrees from the line of magnetization of the stator winding. $b'\,b'$ represent brushes arranged to short-circuit the rotor on the line of magnetization of the stator winding, so that there is a flow of current in the rotor winding induced by the stator winding. C represents a switch arranged to connect the lead 1 from the source of current either to the upper brush $b$, or to the short-circuited brushes $b'$. The other lead 2 from the source is connected to a terminal of the stator winding. With the switch C in the position shown, one-half the rotor turns are cut out of circuit. The current enters the rotor at the lower brush $b$, and leaves at the brushes $b'$. This is the starting position of the switch. When the switch is thrown into its other position for running, the current enters the rotor at the lower brush $b$, and leaves at the upper brush $b$, so that all the rotor turns are in circuit. Thus, by shifting the position of the switch C, the rotor ampere-turns are varied, relatively to the stator winding in the ratio of 2 to 1.

The same method of control may be employed in a simple way with a plurality of motors.

In Fig. 2, two motors are shown connected in parallel, and a two-pole, double-throw switch $C'$ is arranged to connect one lead from the source either to the lower brushes $b$ or to the short-circuited brushes $b'$. For starting, the switch $C'$ is thrown to its upper position, cutting one-half of the rotor turns out of circuit, and for running, the switch is thrown to its lower position, so that all the rotor turns are in circuit.

Fig. 3 shows a suitable arrangement for controlling two motors in series. For starting, switch $C^2$ is opened, and switch $C^3$ is closed. For running, switch $C^3$ is opened and switch $C^2$ is closed, as shown in the figure.

What I claim as new and desire to secure by Letters Patent of the United States, is,—

1. The method of controlling an alternating-current motor of the commutator type having a constant number of field poles and having a plurality of sets of commutator brushes, which consists in employing as rotor terminals at starting brushes displaced from each other less than one hundred and eighty electrical degrees, and in employing as terminals for running brushes displaced from each other by one hundred and eighty electrical degrees.

2. The method of controlling an alternating-current motor of the commutator type having a stator winding, a rotor winding, a set of commutator brushes and connections short-circuiting the rotor substantially on the line of magnetization of the stator winding, and a second set of brushes displaced substantially ninety electrical degrees from the first set, which consists in employing the short-circuiting brushes as one rotor terminal for starting and employing the two brushes of the other set as the two rotor terminals when the motor is up to speed.

3. In combination, an alternating-current motor of the commutator type having a stator winding, a rotor winding, a set of commutator brushes and connections short-circuiting the rotor substantially on the line of magnetization of the stator winding, and a second set of brushes displaced substantially ninety electrical degrees from the first set, terminal connections for the rotor, and a switch arranged to shift one of said terminal connections from the short-circuiting brushes to a brush of the second set.

4. In combination, an alternating-current motor of the commutator type having a stator winding, a rotor winding, a set of commutator brushes and connections short-circuiting the rotor substantially on the line of magnetization of the stator winding, and a second set of brushes displaced substantially ninety electrical degrees from the first set, supply leads for the rotor, and a switch arranged to connect said supply leads alternately to the short-circuiting brushes and one brush of the second set and to the two brushes of the second set.

In witness whereof, I have hereunto set my hand this 11th day of October, 1906.

FRIEDRICH EICHBERG.

Witnesses:
LIONEL FLEISCHMANN,
EMANUEL ROSENBERG.